United States Patent Office 3,574,148
Patented Apr. 6, 1971

3,574,148
CELLULAR POLYURETHANE PLASTICS
Erwin Windemuth and Gerhard Grogler, Leverkusen, Germany, assignors to Farbenfabriken Bayer Aktiengesellschaft, Leverkusen, Germany
No Drawing. Filed Mar. 4, 1969, Ser. No. 804,301
Claims priority, application Germany, Mar. 7, 1968,
P 16 94 250.0
Int. Cl. C08g 22/00, 51/58
U.S. Cl. 260—2.5     2 Claims

ABSTRACT OF THE DISCLOSURE

Cellular polyurethane plastics having improved flame resistance which contain an open chain or cyclic organic ester of an acid of hexavalent sulphur and a bromide or iodide of an alkali metal or an alkaline earth metal, lithium chloride, calcium chloride or magnesium chloride wherein the organic ester contains no hydrogen atoms which are reactive with NCO groups.

---

This invention relates to polyurethane plastics and more particularly to cellular polyurethane plastics which have improved properties and particularly improved resistance to burning.

It is known to prepare foam plastics from compounds which contain reactive hydrogen atoms, organic polyisocyanates, water and/or other blowing agents in either a one-step or a multi-step process. By the use of already known catalysts, emulsifiers, stabilizers, pore size regulators and the like, the foam forming process can be adjusted to the polymer forming reaction so that foam plastics can be produced with varying properties. In fact, it is possible to produce foam plastics on a large industrial scale with mechanical processes and equipment, see for example Kunststoff-Handbuch, vol.. VII, "Polyurethanes," pages 25–28, 96–120 and 440–458, Karl Hanser Publisher, Munich, Germany, 1966.

Cellular polyurethane plastics prepared without special components or additives are combustible, see the above-cited Kunststoff-Handbuch, vol. VII, at page 475, and prior art flame retardants such as tris-(2-chloroethyl)-phosphate or tris-(2,3-dichloropropyl)-phosphate, mixtures of ammonium phosphate and metal oxides or antimony oxide with aluminum powder or bismuth powder must be employed in large amounts before they are effective. Although the burn resistance off polyurethane plastics is thus improved, the flame retarding additives so impair the properties of cellular polyurethanes that they cannot be widely employed. Moreover, known flame retarding agents lose their effect after prolonged storage, thus causing insurmountable problems in the mechanical production of foam plastics because the insoluble, inorganic flame-proofing agents precipitate out of the foam formulation and plug and clog the feeding lines of the equipment. Notwithstanding the foregoing, however, it had not been possible to produce flame-retarded flexible cellular polyurethane plastics having satisfactory physical properties since known phosphorous or halogen containing additives cause the product to discolor, have high compression set and crumble and disintegrate when subjected to high temperatures for even only a few days.

A process has been disclosed for the production of polyurethane foam plastic materials in U.S. Patent No. 3,352,-829 wherein the reaction between an organic polyisocyanate and a polyol is retarded by including an ester of sulphurous acid having the formula $R_2SO_3$ in the reaction mixture. These esters based on tetravalent sulphur acids do not impart flame resistance to cellular polyurethane plastics. It has also been proposed to impart flame resistant properties to polyurethane foams by reacting polyethers which contain hydroxyl or primary or secondary amino groups with polyisocyanates in the presence of open chain or cyclic esters of hexavalent sulphur acids, such esters containing no hydrogen atoms reactive in the polyurethane formulation, using water or any other suitable material as the blowing agent and a tertiary amine catalyst or, in the event that the polyether contains tertiary amino groups, no tertiary amine catalyst is necessary. Although such a process does in fact impart flame resistance to the cellular polyurethane products made thereby it is desirable and in some cases even necessary that the degree of flame retardancy be improved in order that the products obtained are commercially suitable.

It is, therefore, an object of this invention to provide improved cellular polyurethane plastics which are devoid of the foregoing disadvantages.

A further object of this invention is to provide cellular polyurethane plastics which have improved resistance to burning.

Another object of this invention is to provide flexible cellular polyurethane plastics which have improved resistance to burning as well as improved adhesion to sheet structures.

Still another object of this invention is to provide an improved process for the preparation of cellular polyurethane plastics, particularly flexible polyurethane plastics which have improved flame resistance.

Yet another object of this invention is to provide an additive for improving the burn resistance of flexible cellular polyurethane plastics.

The foregoing objects and others which will become apparent from the following description are accomplished in accordance with this invention, generally speaking, by providing cellular polyether-polyurethanes containing an open chain or cyclic organic ester of an acid of hexavalent sulphur, such ester containing no active hydrogen containing groups as determined by the Zerewitinoff method, and a bromide or iodide of an alkali metal or an alkaline earth metal, lithium chloride, calcium chloride, magnesium chloride or mixtures thereof. The process of this invention inheres in reacting an organic polyisocyanate with a polyether which contains hydroxyl and/or amino groups, water and/or other blowing agents in the presence of an ester of a hexavalent sulphur acid which may be either open or cyclic and a bromide or iodide of an alkali metal or an alkaline earth metal, lithium chloride, calcium chloride, magnesium chloride or mixtures thereof. No tertiary amine catalyst need be employed in preparing the polyether-polyurethanes of this invention nor is it necessary that the polyether contain tertiary amino groups.

The cellular polyurethane plastics of the invention are particularly distinguished by being very difficult to burn while simultaneously displaying very good physical properties. The use of the described metal salts in the preparation of the foam in the presence of the open chain or cyclic esters of hexavalent sulphur acids, which esters have no reactive hydrogen atoms, surprisingly imparts a further improvement to the flame resistant properties of the foams although the use of the metal salts on their own, i.e. in the absence of said sulphuric acid esters, does not provide any flame-resistant properties. Hence, a synergistic effect is achieved.

Cellular polyurethane plastics having a low density can easily be produced by using large quantities of blowing agents and it is possible in this manner to avoid high densities and produce cellular polyurethane plastics which have a density as low as about 1 pound to about 1.5 pounds per cubic foot. In order to produce cellular polyurethane plastics which have the most advantageous physical properties it is often desirable to use water as the blowing agent. If water in large quantities is employed, it is necessary to use a corresponding excess of the organic polyisocyanate present to react with the water and generate carbon dioxide as the blowing agent. When large quantities of water are used in the production of cellular polyurethanes the center of large blocks of the foam often becomes charred and, in fact, when careless operating procedures are employed it is possible for the foam to ignite spontaneously. Several fires have been caused in large commercial plants for producing cellular polyurethane plastics as a result of this self-ignition phenomenon. One of the advantages of the present invention is that the combination of the organic esters of hexavalent sulphur which are free of reactive hydrogen atoms and the salts defined herein prevent the self-ignition of foam plastics to an improved degree, even when large quantities of water are used. The process of the invention has other advantages as well in that the plastics produced have substantially no odor in addition to their improved flame resistance. This is a surprising and unique improvement in the properties of flexible cellular polyether polyurethanes which is made possible by this invention.

Still another advantage of the invention is that sheet structures, for example polyvinyl chloride foils and other thermoplastics which are subjected to flame spraying and adhesion techniques, for example according to U.S. Reissue 25,493, exhibit improved adhesion. in fact another advantage is that they may even be welded by high frequency sound with shorter welding times required and with firmer adhesion in the product than when conventional foam plastics based on polyethers are employed. It is especially important in the automotive industry to be able to produce cellular polyurethane plastics which are flexible, which have good physical and mechanical properties and which simultaneously possess this ability to be firmly and permanently adhered to sheet structures such as polyvinyl chloride foils, polyurethane foils, and the like. Still another advantage of the present invention is that the plastics which are produced can be readily adapted to the production of the so-called self-skin or integral skin foams. These foams possess good resistance to oxidation and good flexibility properties so that they pass many of the tests required by automotive manufacturers the world over.

The foam plastics produced according to the invention can be synthesized from hydroxyl polyethers or from polyethers that have terminal primary or secondary amino groups. Suitable hydroxyl polyethers are linear or branched polyalkylene ether polyols which can be obtained, e.g. by polyaddition reactions in which 1,2-alkylene oxides such as ethylene oxide, propylene oxide, 1,2- and 2,3-butylene oxide, epichlorohydrin, styrene oxide or cyclohexene oxide, either alone or in admixture with each other, are added to themselves or to low molecular weight initiator molecules such as water, glycols such as hexanediol-(1,6), 1,3-butylene glycol or the like, polyols such as trimethylolpropane, glycerol, pentaerythritol, resorcinol, hydroquinone, sorbitol and the like or mono- and/or oligosaccharides such as cane sugar, glucose, lactose or degraded starches. Other hydroxyl polyethers which may also be used, preferably in admixture with those already named, are polytetrahydrofuran polyethers and the like. Linear or branched polypropylene glycol ethers which contain predominantly 1,2-propylene oxide are especially suitable according to the invention as well as those mentioned in U.S. Patent No. 3,201,372. In the production of hydroxyl polyethers in which ethylene oxide is used, the latter may be added to the reaction at any stage of the polyaddition. Suitable amino-polyethers include, for example, those indicated in U.S. Patent No. 2,888,439.

The polyether polyols preferably have a molecular weight of from about 500 to about 10,000 and most preferably from about 1000 to about 5000 with hydroxyl numbers in the range of from about 30 to about 600, most preferably from 30 to 75. It is preferred that hydroxyl polyethers be employed as essentially the sole active hydrogen containing compound in the reaction mixture.

Any suitable organic polyisocyanate may be used including, for example, aliphatic polyisocyanates such as 1,4-diisocyanatobutene; 1,6-diisocyanatohexane; m- and p-xylylene diisocyanate; dicyclohexylmethane-4,4'-diisocyanate; cyclohexane-1,3- and cyclohexane-1,4-diisocyanate; 1-methyl-cyclohexane-2,4- and -2,6-diisocyanate; aromatic polyisocyanates such as 1-alkylbenzene-2,4- and -2,6-diisocyanate, e.g. toluylene-2,4- and toluylene-2,6-diisocyanate as well as any isomeric mixtures of these two isocyanates; phenylene-1,3- and phenylene-1,4-diisocyanate; diphenylmethane-4,4'-diisocyanate; naphthylene-1,5-diisocyanate; diphenylether-4,4'-diisocyanate; 2,2'-dimethyldiphenylmethane-4,4'-diisocyanate; polymethylenephenylpolyisocyanates obtained by aniline formaldehyde condensation followed by phosgenation, for example those disclosed in U.S. Patent No. 2,683,730; toluene-2,4,6-triisocyanate; 4,4',4''-triphenylmethane triisocyanate; 1-methyl - 3,5,6-trichlorobenzene-2,4-diisocyanate; and diisocyanato-mono-, di- and trichlorotoluenes obtained by side chain chlorination; the said polyisocyanates may be used either alone or in admixture with each other. Dimeric mono- and polyisocyanates may also be used, e.g. 3,3'-diisocyanato-4,4'-dimethyldiphenyluredione. According to the invention, the polyisocyanates which can be prepared according to German patent specification 1,092,007 and Canadian Pat. No. 698,636 may also be used. Diisocyanates are preferably used.

Generally speaking any suitable ester of an acid of hexavalent sulphur may be used provided it is free of active hydrogen containing groups as determined by the Zerewitinoff method. The following generic classes of esters illustrate many of these which may be used:

(1) Esters of sulphonic acid including
(a) Sulphonates having the formula:

$$R-SO_2-OR$$

wherein R is an organic radical and is preferably lower alkyl, alkenyl, aralkyl, haloalkyl, haloaryl or the like, or (b) Sultones having the formula

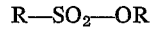

wherein R' is a divalent organic radical and preferably alkylene having 3 to 6 carbon atoms.

(2) Esters of sulphuric acid, for example,
(a) Sulphates having the formula $$RO-SO_2-OR$$

wherein R is an organic radical and preferably lower alkyl, or (b) Cyclic sulphates having the formula

wherein R'' is a divalent organic radical and preferably alkylene having 2 to 6 carbon atoms.

(3) Esters of thiosulphonic acids having the formula, for example, (a) $$R-SO_2SR$$

wherein R is an organic radical and is preferably lower alkyl, alkenyl, aralkyl, haloalkyl, haloaryl or the like, or (b) 

wherein R' is a divalent organic radical and preferably alkylene having 3 to 6 carbon atoms.

(4) Esters of thiosulphuric acid having the formula, for example, (a) $$RS-SO_2OR$$

wherein R is an organic radical and preferably lower alkyl, or (b) 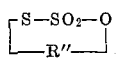

wherein R" is a divalent organic radical and preferably alkylene having 2 to 6 carbon atoms.

The following are specific examples of open or cyclic esters of hexavalent sulphur which have no reactive hydrogen atoms:

Specific examples of esters of sulphonic acid are, for example, aliphatic alkyl sulphonates such as methyl, ethyl or n-butyl methanesulphonate or methyl or ethyl ethane sulphonate; alkyl esters of vinyl-, propene-1- or propene-2-sulphonic acid, in which the alkyl radical may be linear or branched and may contain up to 6 carbon atoms such as methyl, ethyl, isopropyl, hexyl and the like; the ethyl ester of ethyl ether isothionic acid; the dimethyl, diethyl or di-n-propyl ester of sulphacetic acid, dimethyl or diethyl ester of 3-sulphopropionic acid; dimethyl ester of 2-sulpho-isobutyric acid; dimethylester of 4-sulphobutyric acid; aliphatic disulphonic acid esters such as diethylester of 1,2-ethanedisulphonic acid or 1,3-propane disulphonic acid; alkyl esters of benzyl sulphonic acid, such as benzyl sulphonic acid methyl ester and the like. Further, aromatic sulphonic acid alkyl esters in which the aromatic ring may be substituted and the alkyl group may be linear or branched, e.g. methyl, ethyl, propyl, butyl or isobutyl ester of benzenesulphonic acid; ethyl ester of p-chlorobenzenesulphonic acid; alkyl esters of o-, m- and p-toluenesulphonic acid, the alkyl radicals of which esters may be linear or branched and saturated or unsaturated and may contain hetero atoms, e.g. the methyl esters of o-, m- and p-toluenesulphonic acid; the isopropylester, n-butylester, β-chloroethylester, n-dodecylester or oleyl ester of o-, m- or p-toluenesulphonic acid; alkylesters of naphthalene sulphonic acid and dialkyl esters of sulphobenzoic acid, especially the dimethyl ester of sulphobenzoic acid; and alkyl esters of dialkylamidosulphonic acid, such as dimethylesters of diethyl or dibutylamidosulphonic acid. Advantageously, the open or cyclic esters of hexavalent sulphur which have no reactive hydrogen atoms which are used are the corresponding monoesters. Arylbissulphonic acid esters or arylpolysulphonic acid esters, such as the dimethylester of toluenebissulphonic acid may also be used, e.g. phenyl disulphonic acid esters such as phenyl-2,6-disulphonic acid ester, and also diphenylamine-4,4'-disulphonic acid ester.

Sultones are also very suitable and often preferred, especially γ-sultones such as γ-propanesultone, 1,8-naphthosultone, 2,3-benzopropanesultone and delta-butanesultone as well as their alkyl substitution products such as 2-methyl-pentane-sultone-(2,4). Specific examples of esters of sulphuric acid are, for example, dialkyl sulphates such as dimethyl sulphate, diethyl sulphate, dibutyl sulphate, glyoxal sulphate and the like as well as cyclic esters of sulphuric acid such as ethylene glycol sulphate, 1,4-butylene glycol sulphate, 1,6-hexylene glycol sulphate and the like may be used. Specific examples of esters of thiosulphonic acid are, for example, alkyl esters of alkyl thiosulphonic acid, such as methyl methane thiosulphonate or ethyl ethane thiosulphonate and the like or cyclic esters such as γ-propane thiosultone, delta-butane thiosultone and the like. Specific examples of thiosulphuric acid are, for example, the dialkyl esters of thiosulphuric acid such as the dimethyl-, diethyl-, dibutyl- or dihexyl ester of thiosulphuric acid and the like as well as cyclic esters such as the ethylene glycol ester of thiosulphuric acid.

The esters of acids of hexavalent sulphur may be used alone or in admixture with each other. Additions of γ-alkanesultones such as γ-propanesultone and of $C_1$–$C_3$ alkylsubstituted benzene sulphonic acid methyl esters and mixtures thereof are especially advantageous.

According to the invention, the esters of acids of hexavalent sulphur are preferably used in quantities of 1 to 15 parts by weight, most preferably 2 to 5 parts by weight for 100 parts by weight of polyether, preferably polyalkylene ether polyol.

The bromide or iodide of any of the alkali metals or alkaline earth metals as well as lithium chloride, calcium chloride and magnesium chloride may be used either alone or in admixture in the practice of this invention. Some such suitable compounds also include lithium bromide, lithium iodide, sodium bromide, sodium iodide, potassium bromide, potassium iodide, rubidium bromide, rubidium iodide, caesium bromide, caesium iodide, calcium bromide, calcium iodide, magnesium iodide, magnesium bromide, strontium iodide, strontium bromide, barium bromide, barium iodide and the like. Such compounds are preferably used in quantities of 0.1 to 5 parts by weight, preferably 0.1 to 1 part by weight, based on 100 parts by weight of the polyether, either alone or in admixture.

The alkali metal salts and alkaline earth metal salts of this invention may be added in any manner before the foaming of foamable mixtures, either alone or together with the reactants, provided that uniform distribution of the salts in the entire mixture is insured. For example, the salts may be dissolved in the water which may have to be added in any case or they may be mixed to a paste with one of the reactants or auxiliary agents which are used for foaming, or they may be dispersed in them. It is especially advantageous to introduce the salts into the reaction mixture with the tertiary amine catalysts or the polyether. For convenience of operation, it is sometimes advantageous to dissolve or disperse the salts in only a portion of the other reactants which are used, especially in the polyether.

It is frequently desirable though not absolutely essential to the invention to include heretofore known metal catalysts in the foam forming formulations especially in order to adjust the blowing or foam forming process to the polyurethane forming process and make the two proceed synchronously. Any suitable metal catalyst may be used but it is preferred to use compounds containing both tin and organic radicals and particularly organo tin compounds containing divalent tin such as stannous octoate, stannous oleate and the like. Notwithstanding, any suitable catalyst for the production of foams may be used in catalytic quantities as desired. Preferred metal catalysts are organic tin compounds and especially dibutyl tin dilaurate, tin-(II)-ethyl hexoate, lead octoate, lead naphthenate, tin-(II)-stearate, ferric acetyl acetonate, bismuth nitrate, tin acetate, tin naphthenate, tin palmitate, tin stearate, dioctyl tin oxide, tin benzoate, tributyl tin laurate, ferric pentacarbonyl, ammonium molybdate, molybdic glycolate, vanadyl acetonate, copper acetyl acetonate, zinc stearate, tris-N-butyl arsine, tris-N-butyl oxide, dibutyl antimony laurate, manganous acetyl acetonate, dioctyl lead dichloride, diisopropyl oxytitanium-(IV)-acetyl acetonate and the like and mixtures thereof. Other suitable tin compounds are disclosed in British Patent No. 930,635.

Additional foaming catalysts which may be used if necessary together with metal compounds include, for example, urea, N-alkyl urea, N,N'-dialkyl urea or N,N'-diaryl urea, e.g. N-methylurea, N,N'-dimethyl urea, diethyl urea, dibutyl urea or diphenyl urea, N,N,N',N'-tetraalkyl urea or tetraaryl urea, e.g. N,N,N',N'-tetramethyl urea as well as ureas obtained by reaction of aliphatic, cycloaliphatic or aromatic primary or secondary amines with mono- or polyisocyanates and the like. These ureas can be added as such or formed in situ in the foam formulation. Suitable amines include, for example, ethyl amine, butyl amine, dibutyl amine, tertiary butyl amine, cyclohexyl amine, aniline, N,N'-dimethyl ethylene diamine, N,N"-dimethyl diethylene triamine, pyrrolidine, piperidine and the like. Furthermore, lactams or N-substituted lactams can be used foaming catalysts such as, for example, those having the following formula:

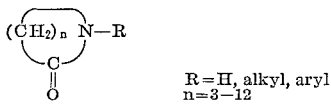
R = H, alkyl, aryl
n = 3–12

Examples of some such suitable compounds include pyrrolidone, N-methyl pyrrolidone, caprolactam, N-butyl caprolactam, N-methyl dodecane lactam and the like. Acid amides such as, for example, formamide, dimethyl formamide, acetamide, dimethyl propion acid amide, dimethyl butyric acid amide and the like can also be used with good results. Mixtures of any of the foregonig catalysts and types of catalysts can also be used in order that the blowing reaction and polyurethane formation may proceed synchronously. Quantities of from about 0.1 to about 10 percent and especially 0.5 to 5 percent are preferred.

In addition it is often desirable to include a foam stabilizer particularly of the organo siloxane alkylene oxide block polymer type. It is preferred to employ a silicone oil of the type disclosed in U.S. Patent No. 2,834,748 within the scope of the formula:

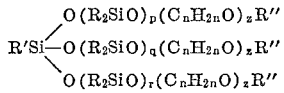

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

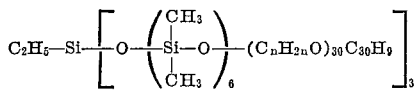

wherein $(C_nH_{2n}A)$ is a mixed polyoxyethylene and oxypropylene block copolymer containing about 17 oxyethylene units and about 13 oxypropylene units.

Various methods may be used for carrying out the instant process. One embodiment involves reacting an hydroxyl or amino polyether with a polyisocyanate, water, at least one ester of an acid of hexavalent sulphur which has no reactive hydrogen atoms, at least one bromide or iodide salt of an alkali metal or alkaline earth metal, lithium chloride, calcium chloride or magnesium chloride, and any auxiliary materials desired such as a filler, dye, catalyst, stabilizer and so on, and at the same time effecting foaming. The quantity of polyisocyanate to be used depends on the reactive hydrogen atoms of the hydroxyl or amino polyether and the quantity of water used, an overall ratio of reactive H (including $H_2O$)/NCO being equal to one or more than one. Smaller quantities of polyisocyanate may be used in order to obtain special properties in the foam. In this embodiment of the invention wherein a one-step method is used to prepare the polyurethane foam it is often advantageous to modify the process by dissolving the sulphur ester and possibly also the salt in the polyisocyanate before the reactants are admixed.

Although in the embodiments described above the esters of acids of hexavalent sulphur and the alkali metal and/or alkaline earth metal salts are foamed at the same time and together with the other components, the so-called two-stage or prepolymer process may also be employed. In the prepolymer process an excess of an organic polyisocyanate is reacted with a polyol to prepare an isocyanate-containing prepolymer which is then converted into a foam in a second step by mixing the prepolymer with water, auxiliary agents, and, if desired, other polyisocyanates, an ester of an acid or hexavalent sulphur which does not contain reactive hydrogen atoms and an alkali metal or alkaline earth metal bromide, chloride or iodide. Such a process very often provides technical processing advantages such as, for example, in so-called mold foaming procedures which may also be carried out in accordance with this invention.

In the embodiments described, the carbon dioxide obtained from the reaction of isocyanate with water serves as the blowing agent for the formation of the foams. As in the known processes, the density of foam is regulated by the quantity of water used. Disubstituted ureas are formed in the reaction between isocyanate and water to serve as linking structural elements between the polyalkylene ether chains which have an elasticizing action.

The addition of smaller quantities of water causes a reduction in the urea content in the foam with simultaneous increase in the density. In order to obtain foams with a low urea content and having a low density, additional blowing agents may be used such as those disclosed in U.S. Patent No. 3,201,372 including low boiling hydrocarbons, especially fluorine- and chlorine-containing alkanes such as monofluorotrichloromethane, difluorodichloromethane, methylene chloride and the like. According to the invention, these blowing agents may be used either alone or in addition to water without any loss in the advantages obtained. By this means the physical properties of the foam can be still further varied as desired.

The foams produced according to the invention are thus distinguished especially by being difficultly inflammable and, if suitable components are chosen, even incombustible. One may, of course, occasionally reinforce this effect by adding known flame protective agents such as tris-(2-chloroethyl)-phosphate, tris-(2,3-dibromopropanol and others as described in Kunststoff-Handbuch (Carl Hanser Verlag, 1966) volume VII, "Polyurethanes", pages 110–111, but in many cases this is not necessary.

The cellular polyurethane plastics of the invention are particularly useful for the preparation of automotive products, including seat cushions, crash pads, head liners and the like. They may also be used for the production of cushions for household use or as insulation, foam tiles for wall coverings and many other uses.

The invention is further illustrated but is not intended to be limited by the following examples in which all parts and percentages are by weight unless otherwise specified.

COMPARISON EXAMPLES 90 parts by weight of a polypropylene glycol ether of OH-number 56,
10 parts by weight of a polypropylene glycol ether of OH-number 110, obtained by addition of propylene oxide to methylamine,
0.8 parts by weight of a polysiloxane alkylene oxide block-copolymer,
0.4 parts by weight of tin(II)-ethylhexoate,
3 parts by weight of water,
0.95 parts by weight of N,N-dimethyl ethanolamine,
42.4 parts by weight of toluylene diisocyanate, isomer mixture of 2,4- and 2,6-isomer in a weight ratio of 80:20%.

With this recipe under identical conditions three polyurethane foams are prepared under addition of (1) 1.5 parts by weight of NaI, which has been dissolved in the water which is used in the recipe.
Result: a highly flexible foam which is inflammable according to ASTM-test D-1692;

(2) 2 parts by weight of γ-propane sultone dissolved in the toluylene diisocyanate.
Result: a highly flexible foam which has an inflammable portion of 50 mm.;

(3) 1.5 parts of NaI, which has been dissolved in the water of the recipe and 2 parts by weight of γ-propane sultone which has been dissolved in the toluylene diisocyanate.

Result: a highly flexible foam which has an inflammable portion of 29 mm. according to ASTM-test D-1692.

EXAMPLE 1

About 80 parts of a partly branched polypropylene glycol ether (OH number 56) containing about 1 part of sodium iodide in solution and about 20 parts of a linear polypropylene glycol ehter (OH number 56) obtained by the addition of propylene oxide to methylamine are intensively mixed with about 3 parts of water, about 1.5 parts of dimethylbenzylamine, about 0.3 part of stannous ethyl hexoate, about 1 part of an organosiloxane-alkylene oxide block polymer and with a solution of about 2 parts of g-propanesultone in about 40.5 parts of tolylene diisocyanate, (isomeric ratio of 2,4-/2,6-tolylene diisocyanate 80:20) and the components are reacted together with continuous stirring. After a short mixing time, the reaction mixture starts to foam and after a few minutes it solidifies to form an open pored, highly elastic foam plastic. According to test ASTM D-1692, the foam produced has a combustible portion of 28 mm. and is thus regarded as self-extinguishing.

EXAMPLE 2

About 100 parts of a partly branched polypropylene glycol ether (OH number 56) are mixed with about 4 parts of diethylethanolamine, about 0.4 part of stannous ethyl hexoate, about 1 part of an organosiloxanealkylene oxide block polymer and a solution of about 0.5 part of potassium bromide in about 3 parts of water. A solution of about 4 parts of methylbenzenesulphonate in about 43 parts of tolylene diisocyanate (ratio of 2,4-/2,6-tolylene diisocyanate isomers 80:20) is added with vigorous stirring. The mixture of the components starts to foam within a few seconds and solidifies in a short time to form an elastic, open-pored foam plastic having a bulk density of about 30 kg./m³. According to test ASTM D-1692, the foam plastic product has a combustible portion of about 30 mm. and is thus regarded as self-extinguishing.

Using the same procedure but without the addition of potassium bromide, a self-extinguishing foam plastic having a combustible portion of 60 to 80 mm. is obtained.

EXAMPLE 3

About 80 parts of a partly branched polypropylene glycol ether (OH number 56) and about 20 parts of a linear polyether (OH number 56) obtained by the addition of propylene oxide to methylamine are intensively mixed with about 1.5 parts of dimethylbenzylamine, about 1 part of an organosiloxane-alkylene oxide block polymer, about 0.3 part of stannous ethyl hexoate and a solution of about 1.5 parts of rubidium iodide in about 3 parts of water. A solution of about 2 parts of g-propanesultone in about 41 parts of tolylene diisocyanate (isomeirc ratio of 2,4-/2,6-tolylene diisocyanate 80:20) is then added to the reaction mixture with continuous stirring. The reaction mixture starts to foam after a few seconds and solidifies after a few minutes to an elastic foam plastic which, according to test ASTM D-1692, has a combustible portion of about 27 mm. and is regarded as self-extinguishing. Similar foam plastics having combustible portions of 36, 32 and 25 mm. respectively are obtained when solutions of 1.44, 1.0 and 0.5 parts of barium iodide, calcium iodide or lithium chloride, respectively, are used instead of rubidium iodide, in each case in 3 parts of water.

Foams without these additions of salt are also self-extinguishing but have combustible portions of 50 to 70 mm.

EXAMPLE 4

About 100 parts of a partly branched polypropylene glycol ether (OH number 56) and about 1 part of dissolved calcium bromide are mixed with about 2 parts of N,N' - dimethyl - N,N' - bis - (2 - hydroxypropyl)-ethylene diamine, about 0.3 part of permethylated diethylene triamine, about 3 parts of dimethylformamide, about 1 part of an organosiloxane-alkylene oxide block polymer, about 0.3 part of stannous ethyl hexoate and about 3 parts of water. A solution of about 2 parts of g-propanesultone in about 43 parts of tolylene diisocyanate (isomeric ratio of 2,4-/2,6-tolylene diisocyanate 80:20) is then added with stirring. After a short starting time, the reaction mixture foams and solidifies after a few minutes to form an open pored, elastic and self-extinguishing foam having a combustible portion of 30 mm. according to test ASTM D-1692.

A similar foam without the addition of calcium bromide has a combustible portion of 50 to 60 mm.

EXAMPLE 5

A mixture of about 80 parts of a partly branched polypropylene glycol ether (OH number 56), about 20 parts of a linear polypropylene gylcol ether (OH number 56) obtained by the addition of propylene oxide to methylamine, about 0.5 part of sodium iodide and about 0.4 part of calcium bromide in solution, is mixed with about 1 part of N-methylmorpholine, about 0.3 part of stannous ethyl hexoate, about 1 part of an organosiloxanealkylene oxide block polymer and about 3 parts of water. A solution of about 2 parts of g-propanesultone in about 41 parts of tolylene diisocyanate (isomeric ratio of 2,4-/2,6-tolylene diisocyanate 80:20) is added to this mixture with intensive stirring. After a starting time of about 10 seconds, the reaction mixture starts to foam and solidifies to form an elastic foam which has a combustible portion of 29 mm. according to test ASTM D-1692 and is regarded as self-extinguishing.

A foam produced from the same recipe but without the addition of the salt has a combustible portion of 50 to 70 mm.

EXAMPLE 6

The following components are mixed together in the mixing chamber of a foaming machine which has a discharge rate of about 13 kg. of polyether per minute, the mixture being stirred at a rate of 3000 revs./min.:

A about 65 parts of a partly branched polypropylene glycol ether based on trimethylolpropane and water (OH number 56, molecular weight 2500).
about 15 parts of a 5% solution of sodium iodide in this polyether, about 20 parts of a polypropylene glycol ether based on methylamine: (OH number 56),

B about 1 part of an organosiloxane-alkylene oxide block polymer, about 3 parts of water,

C about 0.3 part of stannous ethyl hexoate,

D about 1.5 parts of dimethylbenzylamine,

E about 41 parts of tolylene diisocyanate (80 percent by weight of 2,4- and 20 percent by weight of 2,6-isomer),
about 2 parts of propanesultone,
about 2 parts of tris-(2-chloroethyl)-phosphite.

After a starting time of about 5 seconds and a rising time of about 75 seconds, an elastic foam plastic which has the following physical properties is obtained:

Bulk density: 30 kg./m.³
Tensile strength: 1.5 kg. wt./cm.²
Elongation at break: 415%
Compression resistance (40%): 27 p./cm.²

The foam has a combustion length of 24 mm. when tested for flame resistance according to ASTM D-1692.

EXAMPLE 7

A about 60 parts of a slightly branched polypropylene glycol ether (OH number 56, molecular weight 2500),
about 20 parts of a 5% solution of calcium bromide in this polyether,
about 20 parts of an addition product of propylene oxide with methylamine (OH number 56),

B about 1 part of an organosiloxane-alkylene oxide block polymer,
about 2.5 parts of permethylated N-(2-aminoethyl)-piperazine,
about 3 parts of water,

C about 0.2 part of stannous ethyl hexoate,

D about 41 parts of an isomeric mixture of 80% 2,4- and 20% 2,6-diisocyanatotoluene, and
about 2.0 parts of propanesultone are mixed together.

This mixture foams after a short time and attains its full height after about 80 seconds. The resulting foam plastic is self-extinguishing, having a combustible portion of 31 mm. according to ASTM D-1692, and has the following physical properties:

Bulk density: 31 kg./m.³
Tensile strength: 0.8 kg. wt./cm.²
Elongation at break: 235%
Compression resistance (40%): 30 p./cm.²

EXAMPLE 8

A about 70 parts of a partly branched polypropylene glycol ether based on trimethylolpropane and water (OH number 56),
about 7 parts of a 5% solution of calcium bromide in this polyether,
about 20 parts of a linear polypropylene glycol ether (OH number 56),
about 4 parts of N,N' - dimethyl - N,N' - bis-(2-hydroxypropyl)-ethylene diamine,

B about 1 part of an organosiloxane-alkylene oxide block polymer,
about 1 part of N-methylmorpholine,
about 3 parts of water,

C about 0.2 part of stannous ethyl hexoate

D about 44 parts of an isomeric mixture of 80% 2,4- and 20% 2,6-diisocyanatotoluene,
about 2 parts of propanesultone, and
about 3 parts of tris-(2-chloroethyl)-phosphate are mixed together.

After a starting time of about 8 seconds, the mixture becomes cloudy and the foaming reaction terminates after a further 88 seconds.

The foam has the following physical properties:

Bulk density: 31 kg./m.³
Tensile strength: 1.3 kg. wt./cm.²
Elongation at break: 265%
Compression resistance (40%): 30 p./cm.²

The foam also has a combustion length of 30 mm. according to ASTM D-1692 and is therefore self-extinguishing.

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:

1. A flame resistant cellular polyurethane prepared by reacting a polyether with an organic polyisocyanate in the presence of a blowing agent, said polyurethane containing:
 (A) from 1 to 15 parts by weight, based on 100 parts by weight of polyether, of an organic ester of an acid of hexavalent sulfur, said ester being free from active hydrogen containing groups as determined by the Zerewitinoff method and being selected from the group consisting of:
  (1) sulphonates having the formula:

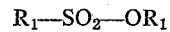

wherein R₁ is selected from the group consisting of alkyl, alkenyl, aralkyl, haloalkyl, and haloaryl;
  (2) sultones having the formula:

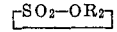

wherein R₂ is alkylene having 3 to 6 carbon atoms;
  (3) sulphates having the formula:

wherein R₃ is alkyl;
  (4) cyclic sulphates having the formula:

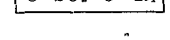

wherein R₄ is alkylene having 2 to 6 carbon atoms:
  (5) esters of thiosulphonic acids having the formula:

wherein R₅ is selected from the group consisting of alkyl, alkenyl, aralkyl, haloalkyl, and haloaryl;
  (6) esters of thiosulphonic acids having the formula:

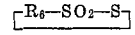

wherein R₆ is alkylene having 3 to 6 carbon atoms:
  (7) esters of thiosulphuric acid having the formula:

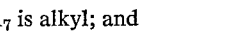

wherein R₇ is alkyl; and
  (8) esters of thiosulphuric acid having the formula:

wherein R₈ is alkylene having 2 to 6 carbon atoms; and
 (B) from 0.1 to 5 parts by weight, based on 100 parts by weight of polyether, of a member selected from the group consisting of (i) alkali metal or alkaline earth metal bromides or iodides, (ii) lithium chloride, (iii) calcium chloride, and (iv) magnesium chloride.

2. The polyurethane of claim 1 wherein the polyether is a polypropylene glycol ether, the organic isocyanate is tolylene diisocyanate, (A) is propanesultone or methylbenzenesulphonate and (B) is sodium iodide, potassium bromide, rubidium iodide or calcium bromide.

References Cited

UNITED STATES PATENTS

| | | | |
|---|---|---|---|
| 3,067,149 | 12/1962 | Dombrow | 260—2.5 |
| 3,388,081 | 6/1968 | Merten et al. | 260—2.5 |

FOREIGN PATENTS

| | | | |
|---|---|---|---|
| 1,043,630 | 11/1958 | Germany | 260—2.5 |

OTHER REFERENCES

Dutch Patent Specification Publication No. 68-04033, 32 pp. (1968).

DONALD E. CZAJA, Primary Examiner

E. C. RZUCIDLO, Assistant Examiner

U.S. Cl. X.R.

260—45.7, 45.95